(12) United States Patent
Christophersen et al.

(10) Patent No.: US 10,272,558 B2
(45) Date of Patent: *Apr. 30, 2019

(54) POWER TOOL HAVING AN ELONGATED HOUSING SUPPORTING A POWER MODULE

(71) Applicant: Black & Decker Inc., New Britain, CT (US)

(72) Inventors: Kyle J. Christophersen, Lutherville-Timonium, MD (US); Daniel F. Nace, Towson, MD (US); James H. Stiles, III, Baltimore, MD (US); Floyd E. Moreland, IV, York, PA (US); Craig A. Oktavec, Forest Hill, MD (US); David J. Smith, Colmbia, MD (US); Zollie W. Privett, Jr., Baltimore, MD (US); Matthew J. Velderman, Baltimore, MD (US); Colin M. Crosby, Baltimore, MD (US); Pradeep M. Pant, Cockeysville, MD (US)

(73) Assignee: Black & Decker Inc., New Britain, CT (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/622,619

(22) Filed: Jun. 14, 2017

(65) Prior Publication Data

US 2017/0274520 A1 Sep. 28, 2017

Related U.S. Application Data

(63) Continuation-in-part of application No. 15/262,053, filed on Sep. 12, 2016.

(Continued)

(51) Int. Cl.
*B24B 23/02* (2006.01)
*B24B 47/10* (2006.01)
(Continued)

(52) U.S. Cl.
CPC .............. *B25F 5/008* (2013.01); *B24B 23/02* (2013.01); *B24B 23/028* (2013.01); *B24B 47/10* (2013.01);
(Continued)

(58) Field of Classification Search
CPC ....... B23Q 11/10; B24B 23/02; B24B 23/028; B24B 47/10; B24B 47/12; B25F 5/008; B25F 5/00; H02K 7/145; H02K 11/0073
See application file for complete search history.

(56) References Cited

U.S. PATENT DOCUMENTS

| 8,816,544 B2 | 8/2014 | Tanimoto et al. |
| 9,314,900 B2 | 4/2016 | Vanko et al. |

(Continued)

*Primary Examiner* — Timothy V Eley
(74) *Attorney, Agent, or Firm* — Amir Rohani

(57) ABSTRACT

A power tool is provided including an elongated housing. The housing includes a motor case disposed at a front end thereof and a handle portion extending along a longitudinal axis of the housing from the motor case to a rear end of the housing. The handle portion includes two elongated walls extending from the motor case along the longitudinal axis of the housing to form a planar opening within the handle portion. A partition wall is arranged along an axis substantially perpendicular to the longitudinal axis of the housing, separating the handle portion from the motor case. An electric motor having a drive shaft is mounted within the motor case, and a module casing supporting a planar circuit board is received within the planar opening and supported by the elongated walls within the handle portion of the housing axially along the longitudinal axis of the housing.

16 Claims, 14 Drawing Sheets

Related U.S. Application Data

(60) Provisional application No. 62/322,462, filed on Apr. 14, 2016, provisional application No. 62/249,528, filed on Nov. 2, 2015, provisional application No. 62/241,385, filed on Oct. 14, 2015.

(51) Int. Cl.

| | | |
|---|---|---|
| *B24B 47/12* | (2006.01) | |
| *B24B 49/10* | (2006.01) | |
| *H02K 7/14* | (2006.01) | |
| *B25F 5/00* | (2006.01) | |
| *H02K 5/04* | (2006.01) | |
| *H02K 11/33* | (2016.01) | |
| *H02K 7/00* | (2006.01) | |
| *H02K 7/08* | (2006.01) | |
| *H02K 9/10* | (2006.01) | |
| *B25F 5/02* | (2006.01) | |

(52) U.S. Cl.
CPC ............. *B24B 47/12* (2013.01); *B24B 49/10* (2013.01); *B25F 5/02* (2013.01); *H02K 5/04* (2013.01); *H02K 7/003* (2013.01); *H02K 7/085* (2013.01); *H02K 7/145* (2013.01); *H02K 9/10* (2013.01); *H02K 11/33* (2016.01)

(56) References Cited

U.S. PATENT DOCUMENTS

| | | | |
|---|---|---|---|
| 2009/0207035 A1* | 8/2009 | Watanabe | B24B 23/028 340/657 |
| 2011/0171887 A1* | 7/2011 | Tanimoto | B24B 23/028 451/359 |
| 2015/0111480 A1* | 4/2015 | Vanko | B25F 5/008 451/359 |
| 2017/0106522 A1* | 4/2017 | Coates | H02K 11/33 |
| 2017/0110935 A1* | 4/2017 | Oktavec | H02K 7/145 |
| 2017/0110945 A1* | 4/2017 | Crosby | H02K 11/33 |
| 2017/0110946 A1* | 4/2017 | Oktavec | H02K 11/33 |
| 2017/0274520 A1* | 9/2017 | Christophersen | B24B 23/02 |
| 2017/0341213 A1* | 11/2017 | Mashiko | B25F 5/00 |
| 2018/0056497 A1* | 3/2018 | Chen | B24B 23/028 |
| 2018/0085884 A1* | 3/2018 | Liaw | B24B 23/02 |
| 2018/0099372 A1* | 4/2018 | Takeda | B25F 5/00 |

\* cited by examiner

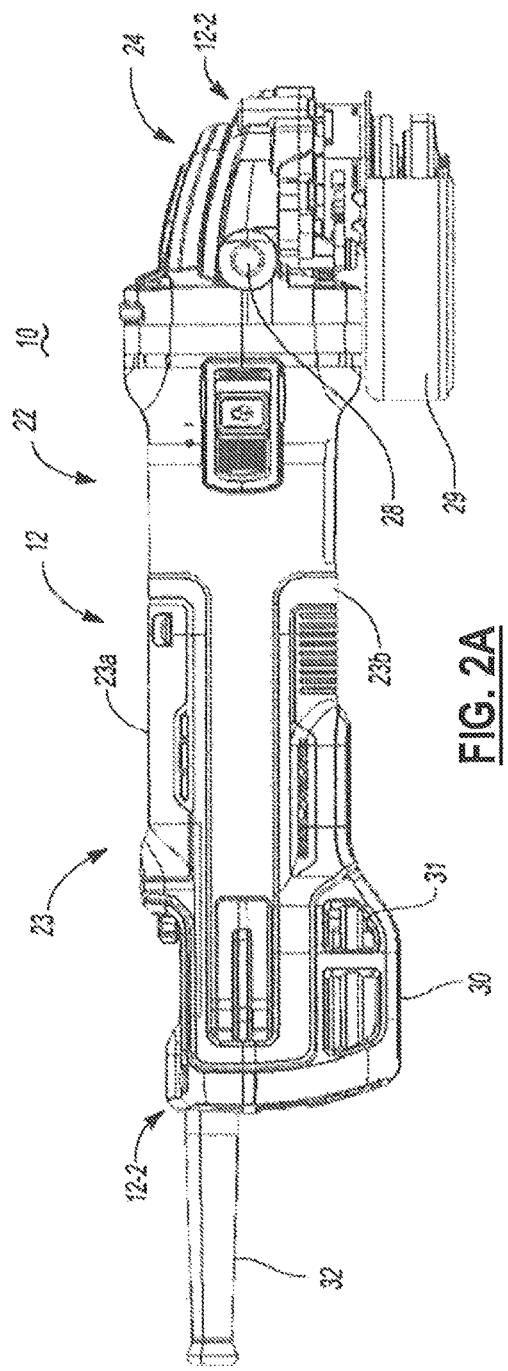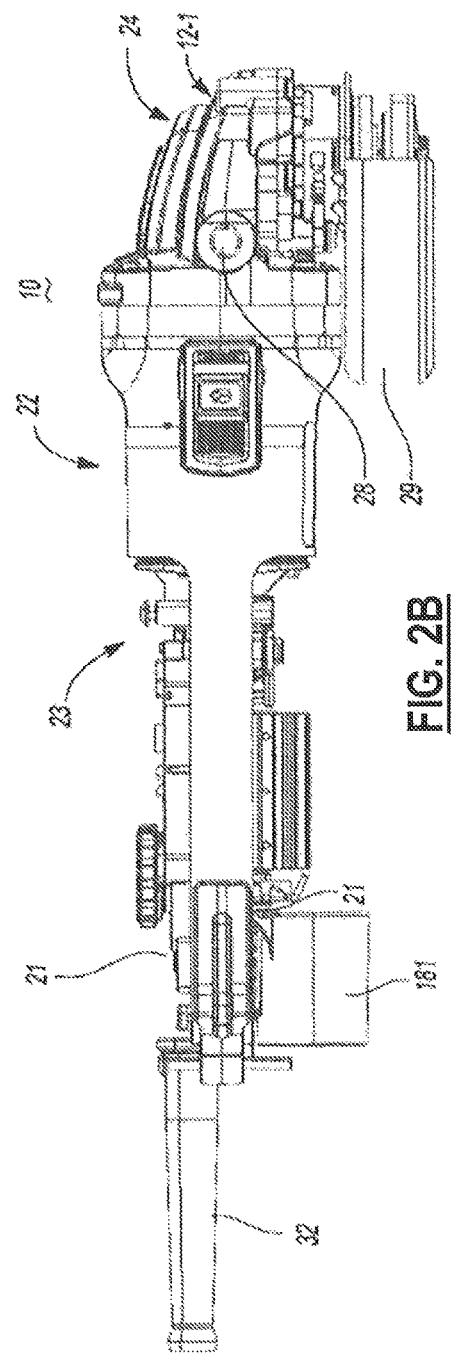

POWER TOOL HAVING AN ELONGATED HOUSING SUPPORTING A POWER MODULE

CROSS-REFERENCE TO RELATED APPLICATIONS

This application is a continuation-in-part of co-pending U.S. patent application Ser. No. 15/262,053 (published as US Patent Publication No. 2017/0106490) filed Sep. 12, 2016, which claims the benefit of U.S. Provisional Application Nos. 62/241,385 filed on Oct. 14, 2015, and 62/249,528 filed on Nov. 2, 2015, and 62/322,462 filed on Apr. 14, 2016. The entire disclosures of the above applications are incorporated herein by reference.

FIELD

The present disclosure relates to various features of a handheld grinder or similar power tool having a brushless electric motor.

BACKGROUND

Some power tools include brushless electric motors. Power tools with brushless electric motors are used for woodworking and metalworking, for example. The environments that power tools are used in contain various contaminants (e.g., dust, debris, fluids). These contaminants compromise various components of the power tool, which undesirably impacts the function, durability, and reliability of the power tool.

Additionally, most power tools include several circuit boards that reside inside a housing of the power tool. The circuit boards are used to support the capacitor, the power switch and circuitry that is used for controlling the brushless motor. These components undesirably increase the heat generation of the power tool during the operation thereof.

Therefore, there is a need for a power tool that protects components from contamination in such working environments while generating less heat, thereby improving the function, durability, and reliability of the power tool.

This section provides background information related to the present disclosure and is not necessarily prior art.

SUMMARY

This section provides a general summary of the disclosure, and is not a comprehensive disclosure of its full scope or all of its features.

According to an embodiment, a power tool is provided including an elongated housing. The housing includes a motor case disposed at a front end thereof and a handle portion extending along a longitudinal axis of the housing from the motor case to a rear end of the housing. The handle portion includes two elongated walls extending from motor along the longitudinal axis of the housing to form a planar opening within the handle portion. In an embodiment, a partition wall is arranged along an axis substantially perpendicular to the longitudinal axis of the housing, the partition wall separating the handle portion from the motor case.

In an embodiment, the power tool further includes an electric motor having a drive shaft and mounted within the motor case, and a module casing supporting a planar circuit board received within the planar opening and supported by the elongated walls within the handle portion of the housing, the module casing extending axially along the longitudinal axis of the housing, the planar circuit board accommodating a motor drive circuit including motor switches arranged to deliver power to the electric motor.

In an embodiment, the power tool further includes an output shaft drivably coupled to the drive shaft of the electric motor and extending perpendicular to the drive shaft.

In an embodiment, the partition wall is configured to support a rear bearing for the drive shaft of the electric motor and includes one or more holes that permit air flow between the motor case and the handle portion of the housing.

In an embodiment, the partition wall includes a pocket defining an open end and a closed end, where the open end of the pocket faces front end of the housing and is sized to receive the rear bearing.

In an embodiment, the power tool further includes one or more position sensors mounted to a position sense board, and a slot formed in the pocket and configured to receive the position sense board therein.

In an embodiment, a rear face of the partition wall supports the module casing within the handle portion.

In an embodiment, the power tool further includes a rear wall disposed at the rear end of the housing extending from ends of the two elongated walls to define the planar opening.

In an embodiment, the power tool further includes a link capacitor mounted on the planar circuit board and coupled across a DC power bus receiving power from a power supply, and an auxiliary capacitor having a capacitance more than capacitance of the link capacitor and switchably coupled across the DC power bus, wherein the auxiliary capacitor is mounted in the lower section of the handle portion and at the rear end of the handle portion of the housing.

In an embodiment, the circuit board includes a top board segment integrally interconnected by a hinge section to a bottom board segment, such that the top board segment is folded over top of the bottom board segment and the top board segment is affixed to a top surface of the module casing and the bottom board segment is affixed to a bottom surface of the module casing.

In an embodiment, the motor switches are mounted along two lateral side surfaces of the module casing and the power tool further includes a heat sink mounted to each of the two lateral side surfaces of the module casing, such that the heat sink is adjacent and thermally coupled to the plurality of motor switches.

In an embodiment, the planar opening divides the handle portion to an upper portion and a lower portion, wherein the module casing is received into the planar opening from the upper portion and the heat sink is disposed within the lower portion.

In an embodiment, the module casing further includes side walls in contact with and supported by the elongated walls of the handle portion.

In an embodiment, the elongated wall includes ribs disposed along lower axial portions thereof for supporting the side walls of the module casing.

In an embodiment, the power tool further includes a first handle cover that mates with a first axial end of each of the elongated walls to encapsulate the module casing within the handle portion.

In an embodiment, the planar opening divides the handle portion to an upper portion and a lower portion, where the module casing is received into the planar opening from the upper portion, and the at least one handle cover is arranged over the upper portion.

In an embodiment, the power tool further includes a second handle cover that mates with a second axial end each of the elongated walls and arranged over the lower portion.

In an embodiment, the power tool further includes fasteners received through first through-holes of the first handle cover and second through-holes of the handle portion, and fastened into threaded holes of the second handle cover, to secure the first handle cover and the second handle cover to the elongated walls around the module casing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A and 2B are side views of the power tool with a bottom handle cover attached and removed, respectively;

DETAILED DESCRIPTION

Example embodiments will now be described more fully with reference to the accompanying drawings.

Figure 1:
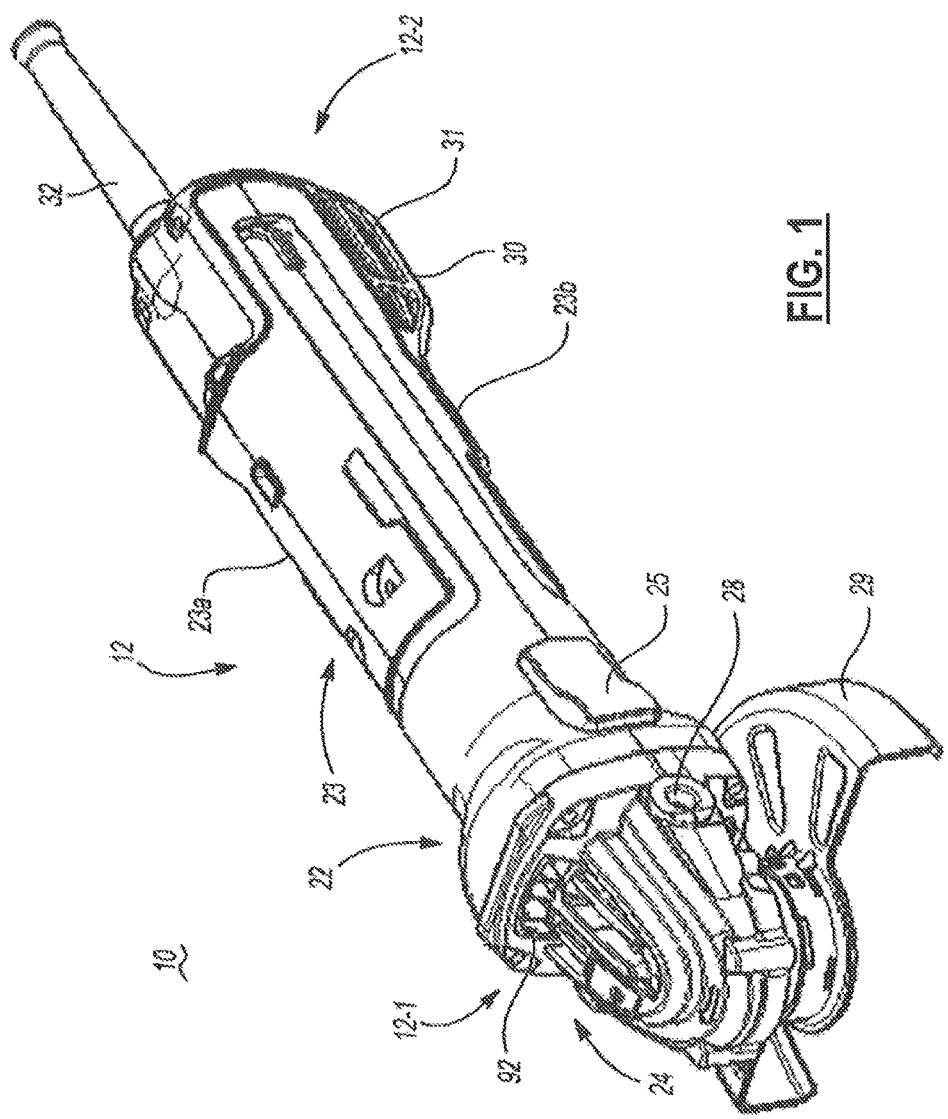
FIG. 1 is a perspective view of a power tool.
Figure 3:
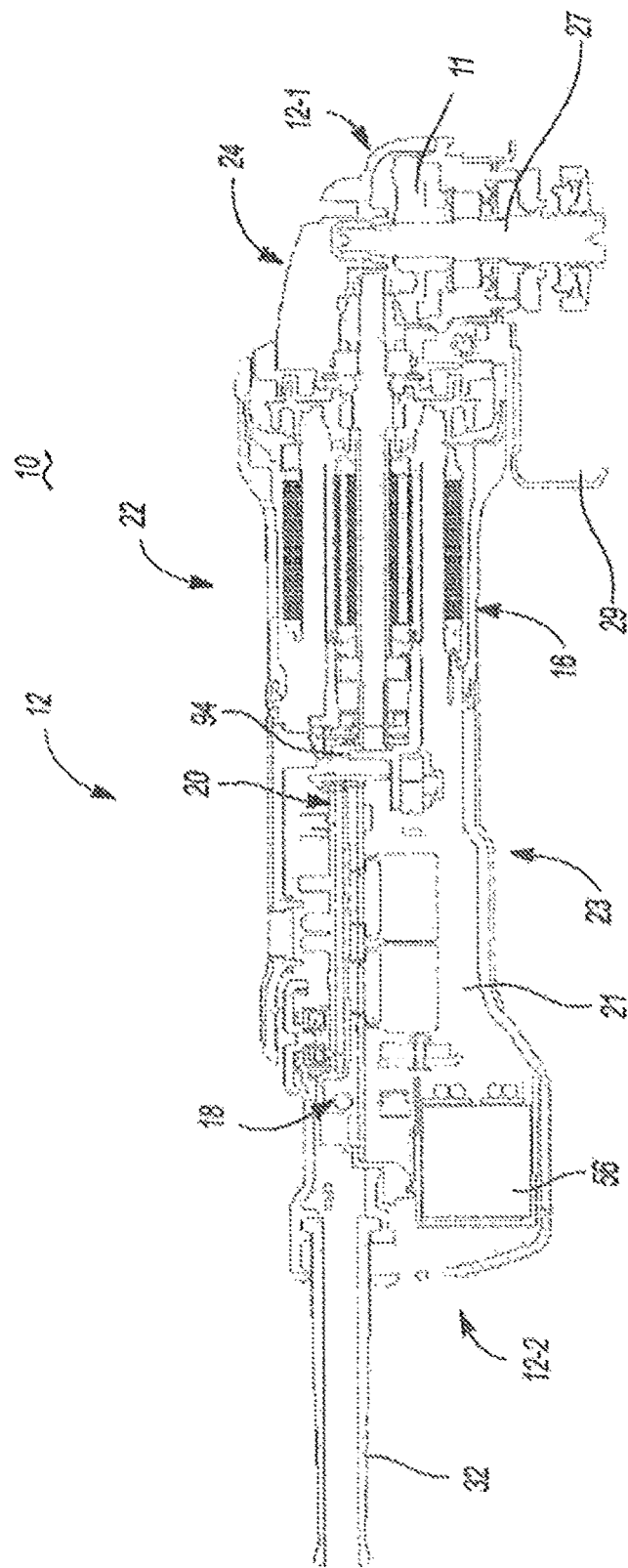
FIG. 3 is a cross-sectional side view of an example embodiment of the power tool.

Referring to FIGS. 1, 2A, 2B, and 3, a power tool 10 is shown. In this example embodiment, the power tool 10 includes an elongated housing 12, a motor 16 (FIG. 3), a module casing or power module support structure 18 (FIG. 3), and a planar circuit board 20 (FIG. 3).

The housing 12 defines a cavity 21 (FIG. 3) and includes a motor case 22 and a handle portion 23. The motor case 22 is positioned at one end 12-1 of the housing 12 and includes a gear case 24 and a power switch 26. The gear case 24 includes a gearset 11, an output shaft 27, and a threaded opening 28. The gearset 11 is positioned within the gear case 24 and is drivably coupled to the motor 16. The output shaft 27 is drivably connected to the gearset 11 within the gear case 24 and extends perpendicular to the longitudinal axis of the housing 12. The output shaft 27 is also coupled to a grinding or a cutting disc (not shown) via a flange (not shown). The grinding disk may be removed and replaced with a new grinding disk. For example, a user of the power tool 10 may replace the existing grinding disk with a new grinding disk after the existing disk wears out. An adjustable guard 29 may cover at least a portion of the rotating disk to obstruct sparks and debris generated during operation of the power tool 10. The threaded opening 28 allows for selectively attaching a side-handle (not shown) to enable two-handed operation. The power switch 26 is positioned on a side of the motor case 22 and allows for the user to turn the power tool 10 ON and OFF.

The handle portion 23 extends axially from the motor case 22 toward a second end 12-2 of the housing 12 and includes a first cover 23a and a second cover 23b. The first and the second covers 23a, 23b are secured together around the module casing 18 and the planar circuit board 20 disposed within the cavity 21 of the handle portion 23. The second cover 23b includes a support member 30 protruding outwardly therefrom and positioned at the second end 12-2 of the housing 12. The support member 30 includes openings 31 extending therethrough to allow incoming air to enter the cavity 21. An AC power cord 32 is attached to the handle portion 23 at the second end 12-2 of the housing 12 to supply electric power to the power tool 10.

While the present description is provided with reference to a grinder, it is readily understood that the broader aspects of the present disclosure are applicable to other types of power tools, including but not limited to sander, drill, impact driver, tapper, fastener driver, and saw. For example, the power tool 10 may include a chuck that is configured to receive a drill bit or a screw bit, thereby allowing the power tool 10 to be used as a power drill or a power screw driver.

Figure 4:
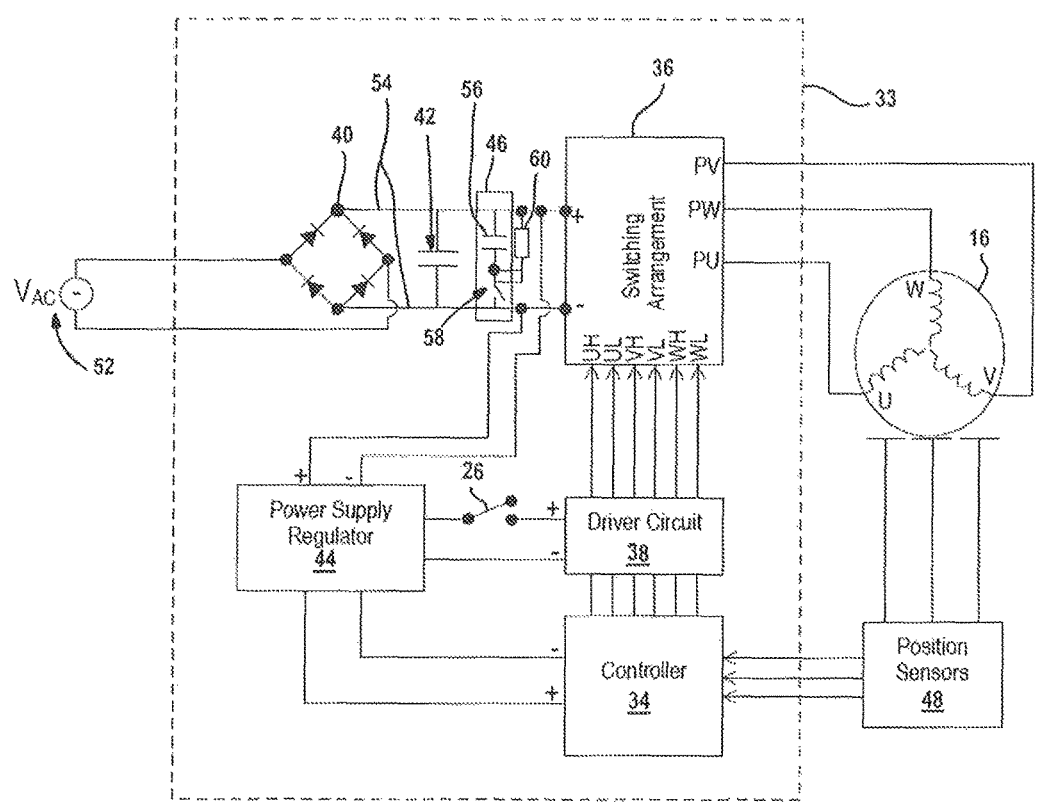
FIG. 4 is a schematic circuit diagram of an example motor control system for the power tool.

FIG. 4 depicts a schematic that illustrates an example of a motor drive circuit 33. Many components included in the motor drive circuit 33 may be integrated on the planar circuit board 20 disposed entirely within the cavity 21 of the handle portion 23. The motor drive circuit 33 is comprised generally of a controller 34, a switching arrangement 36, a driver circuit 38, a rectifier 40, a DC bus capacitor 42, a power supply 44, and an auxiliary switch path 46. The motor drive circuit 33 may further include positioned sensors 48, such as Hall Effect sensors that are configured to detect rotational motion of the motor 16 and generate a signal indicative of the rotational motion. The signal may have a periodic waveform whose magnitude may vary in accordance with the rotational position of the motor 16. It should be noted, that other types of positional sensors may be alternatively utilized and should not be limited to Hall Effect sensors.

An AC supply 52 delivers an alternating current to the rectifier 40 through, for example, the power cord 32. The rectifier 40 converts the alternating current into a direct current that is outputted to a DC bus 54 (i.e., power line/bus). The output of the rectifier 40 may be pulsating DC signal and not a pure DC signal.

The DC bus capacitor 42 is electrically connected in parallel with the rectifier 40. The switching arrangement 36 is electrically connected with the DC bus capacitor 42 and may receive the pure DC signal or the substantially pure DC signal from the DC bus capacitor 42 via the DC bus 54. The switching arrangement 36 includes a plurality of motor switches that, when switched on, deliver the DC current to the motor 16. The motor switches may be IGBTs or FETs, for example. The switching arrangement 36 may be further defined as a three-phase inverter bridge although other arrangements are contemplated by this disclosure.

The driver circuit 38 interfaces with the motor switches of the switching arrangement 36. The driver circuit 38 controls the state of the motor switches. In the example embodiment, the driver circuit 38 is shown as being separate from the switching arrangement 36. Alternatively, the driver circuit 38 and the switching arrangement 36 may be a single integrated circuit which may be commercially available from various manufacturers. For example, the switching arrangement 36, which may include IGBTs, and the driver circuit 38 may be a part of an integrated power module.

The controller 34 interfaces with the driver circuit 38 and may generate PWM signals to control the motor 16. In this embodiment, the controller 34 receives power from the power supply regulator 44. In an alternate embodiment, the controller 34 may receive power directly from the rectifier 40.

The power supply regulator 44 is electrically connected in parallel with the rectifier 40 and operates to power the driver circuit 38 via the power on/off switch 26. The power on/off switch 26 is positioned between the power supply regulator 44 and the driver circuit 38.

When the power on/off switch 26 is switched to the ON-position, the driver circuit 38 receives power from the power supply regulator 44. When the driver circuit 38 receives power, the driver circuit 38 is able to control the state of the motor switches and the motor 16 is on.

Conversely, when the power on/off switch 26 is switched to the OFF-position, the driver circuit 38 does not receive power from the power supply regulator 44. When the driver circuit 38 does not receive power, the driver circuit 38 is not able to control the state of the motor switches and the electric motor is off.

As illustrated, the power on/off switch 26 is electrically connected between the rectifier 40 and the driver circuit 38. The power on/off switch 26 is positioned such that the power from the AC power supply 52 does not pass through the power on/off switch 26. Furthermore, the current being drawn by the motor 16 does not pass through the power on/off switch 26. The current passing through the power on/off switch 26 is the current being drawn by the driver circuit 38 and the current being drawn by the driver circuit 38 is lower than the current being drawn by the electric motor 16.

The DC bus capacitor 42 may be a link capacitor having relatively small capacitance and does not act to smoothen the full-wave rectified AC voltage. The DC bus capacitor 42 is a bypass capacitor that removes the high frequency noise from the bus voltage.

The auxiliary switch path 46 is electrically coupled in parallel with the rectifier 40 and the link capacitor 42, and is electrically connected between the rectifier 40 and the switching arrangement 36. The auxiliary switch path 46 includes an auxiliary capacitor 56 and a switch 58 positioned in series with the auxiliary capacitor 56.

The switch 58 may be a controlled switch, such as a MOSFET or an IGBT, in an embodiment. The switch 58 may be controlled by software programmed into the controller 34 or another programmable microcontroller. Alternatively, the switch 58 may be controlled by hardware, such as a switch control circuit 60, described in detail below. When the switch 58 is closed, the auxiliary capacitor 56 is connected parallel to the DC bus capacitor 42.

Figure 5:
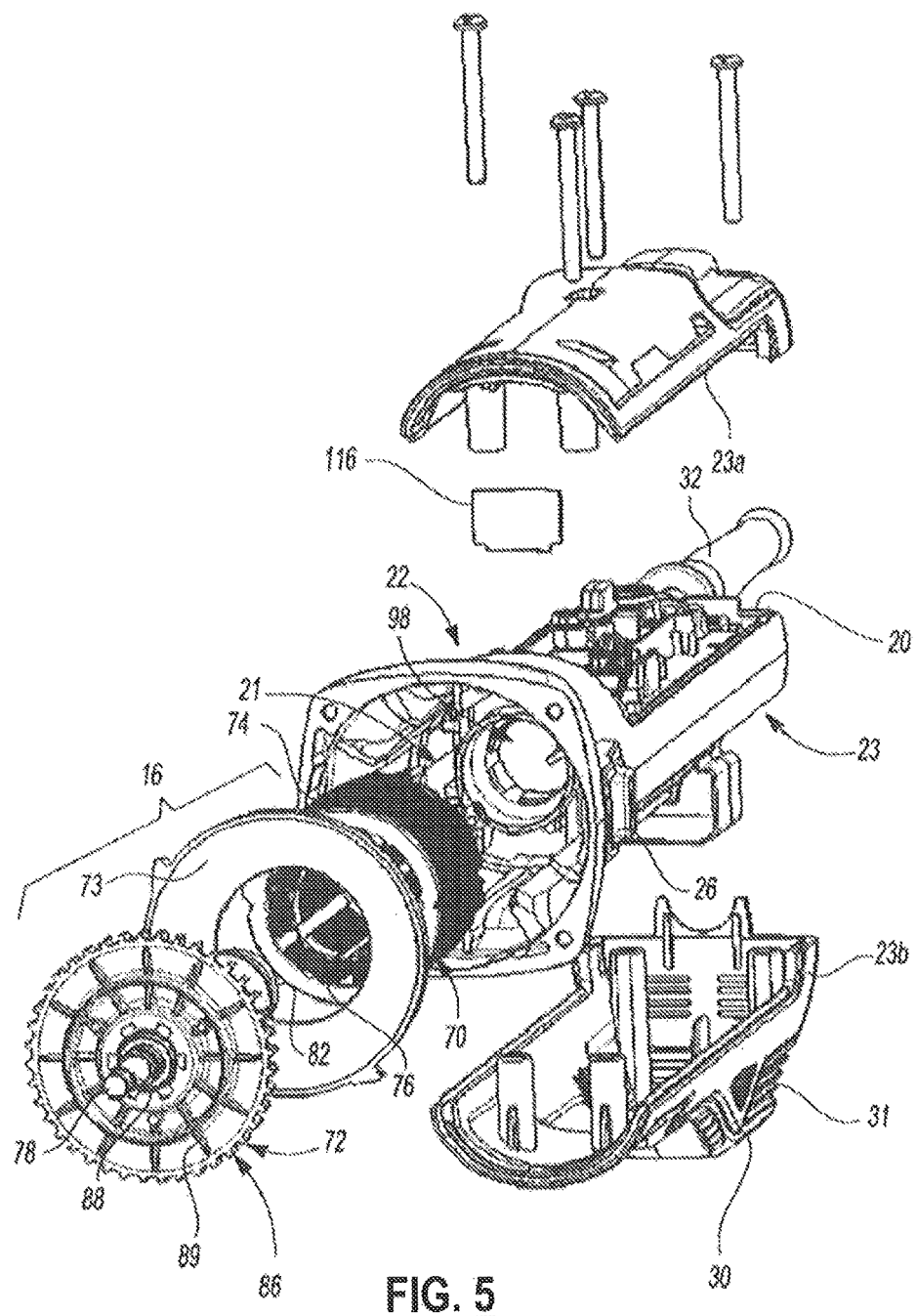
FIG. 5 is a perspective exploded view of the example embodiment of the power tool.
Figure 6:
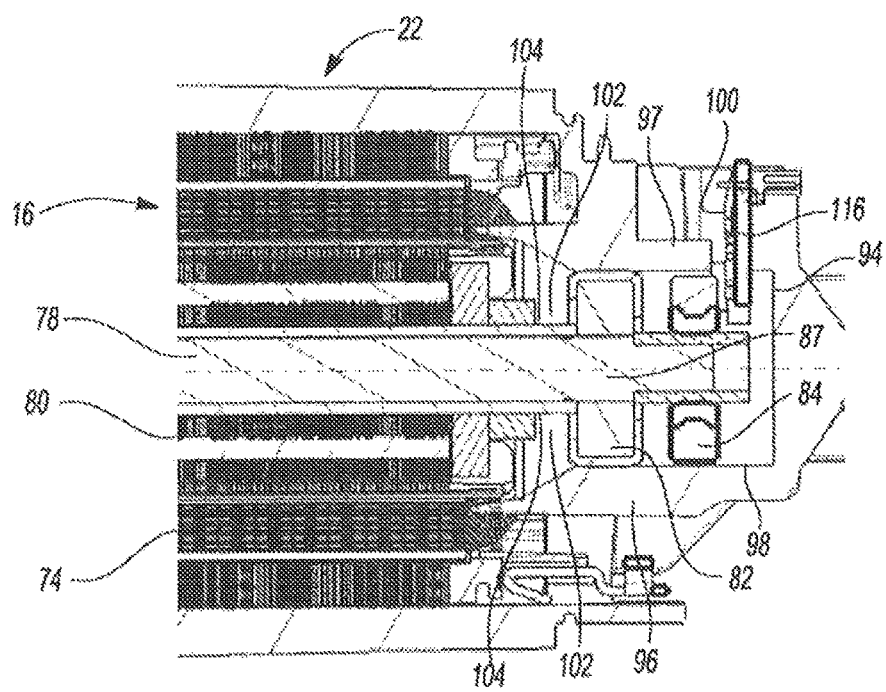
FIG. 6 is a partial cross-sectional view of the motor case in the example embodiment of the power tool.
Figure 7A:
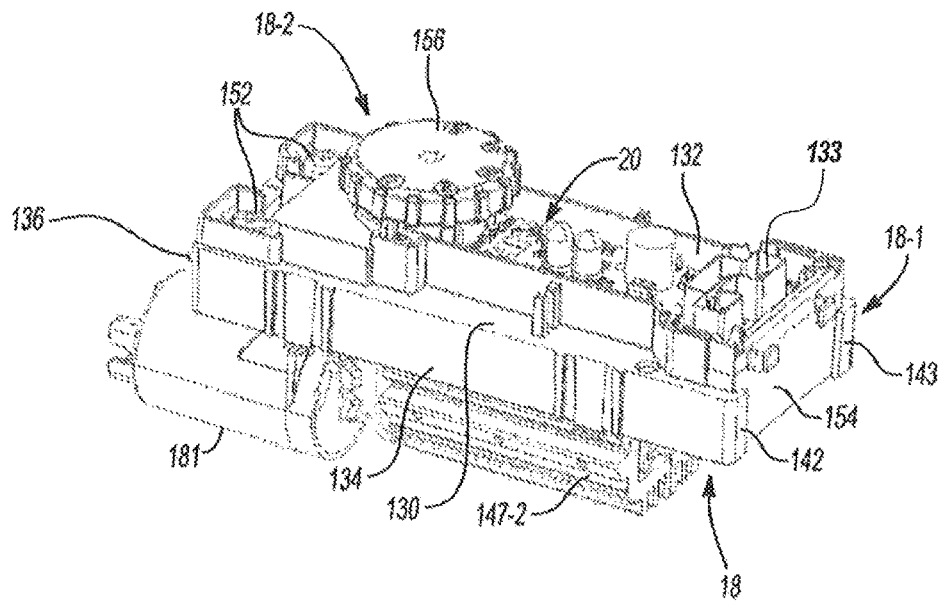
FIGS. 7A and 7B are isometric views of a control side and a power side, respectively, of a power and control module in the example embodiment of the power tool.
Figure 7B:
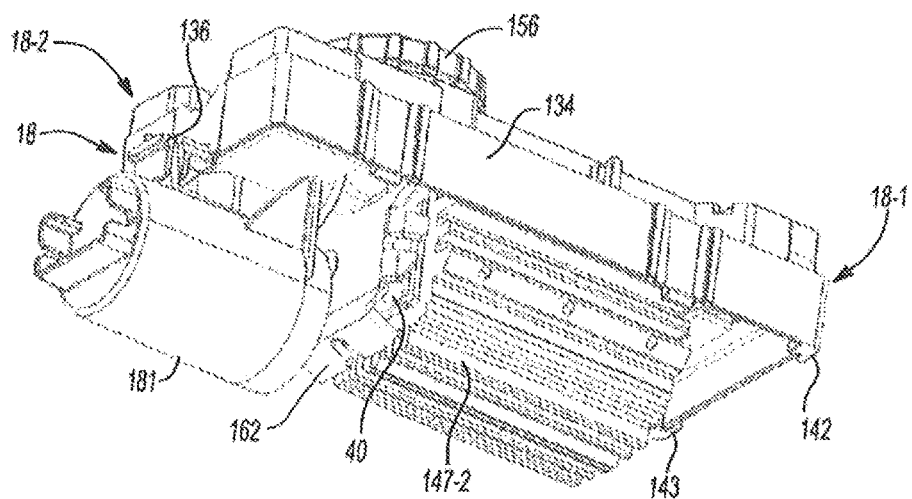

Referring to FIGS. 5 and 6, the motor 16 is mounted within the cavity 21 of the motor case 22. The motor 16 is also drivably coupled to the output shaft 27 (FIG. 3) of the gear case 24. The motor 16 is a three-phase brushless DC (BLDC) motor and includes a stator assembly 70, a rotor assembly 72, and a baffle 73 (FIG. 5). The stator assembly 70 includes a cylindrical lamination stack 74 configured to receive a portion of the rotor assembly 72. The cylindrical lamination stack 74 further includes windings 76 wound and connected in either a wye or a delta configuration around the rotor assembly 72 to define the three phases of the motor 16.

The rotor assembly 72 includes a rotor shaft 78, a cylindrical rotor lamination stack 80 (FIG. 6), a rear bearing 82, a sensing magnet 84, and a fan 86 (FIG. 5). The rotor shaft 78 is drivably coupled to the output shaft 27 (FIG. 3) and extends longitudinally through the motor case 22 of the housing 12. The rotor lamination stack 80 is rotatably mounted on the rotor shaft 78. The rotor lamination stack 80 may include a series of flat laminations (not shown) attached together via an interlock (e.g., snap-fitted, adhesive, overmold) that houses or hold two or more permanent magnets (not shown) therein. The rear bearing 82 is mounted on a rear end 87 of the rotor shaft 78 to support the shaft 78 within the power tool 10. The sensing magnet 84 is rotatably mounted on the rear end 87 of the rotor shaft 78 behind the rear bearing 82.

The fan 86 is rotatably mounted on a front end 88 of the rotor shaft 78. The fan 86 of the rotor assembly 72 includes blades 89 that rotate with the shaft 78 to facilitate the incoming air entering the openings 31 to flow through the motor 16. The baffle 73 disposed between the stator assembly 70 and the fan 86 guides the air flowing through the housing 12 towards exhaust vents 92 (FIG. 1) of the gear case 24.

With reference to FIG. 6, a partition member or wall 94 separates the cavity 21 (FIG. 3) of the housing 12 between the motor case 22 and the handle portion 23. The partition member 94 may be integrally formed with the housing 12 and extend perpendicular relative to the longitudinal axis of the housing 12. The partition member 94 includes at least one aperture 95 at a periphery thereof to permit air flow between the motor case 22 and the handle portion 23. The partition member 94 also includes first and second axial walls 96, 97 extending perpendicular therefrom. The partition member 94 and the first and second walls 96, 97 cooperate to form a cylindrically-shaped pocket 98. The second wall 97 having a radially extending slot 100 (i.e., perpendicular to the longitudinal axis of the rotor shaft 78) that extends therethrough such that the pocket 98 is accessible through the slot 100. A circuit board 116 including positional sensors (e.g., Hall sensors) may be received through the slot 100 to cooperate with the sense magnet 84.

A flange 102 extends perpendicular from terminal ends of the walls 96, 97 toward the rotor shaft 78 to define an opening 104 in the pocket 98. The opening 104 of the pocket faces the gear case 24 (FIG. 1) at the one end 12-1 of the housing 12. Once the motor 16 is mounted within the motor case 22, the pocket 98 receives the rotor shaft 78, the rear bearing 82, and the sensing magnets 84 of the rotor assembly 72. The sensing magnet 84 is disposed at the rear end 87 of the shaft 78 between the rear bearing 82 and the partition member 94. The rear bearing 82 is positioned between the rotor lamination stack 80 and the sensing magnet 84.

Referring to FIGS. 7A-9, the rectangular module casing 18 is provided. The module casing 18 is disposed entirely within the cavity 21 (FIG. 3) of the handle portion 23 of the housing 12. The module casing 18 defines a first end 18-1 and a second end 18-2. The first end 18-1 is positioned adjacent to the motor case 22 (FIG. 3) of the housing 12 and the second end 18-2 of the module casing 18 extends toward the second end 12-2 of the housing 12. The casing 18 also includes a first surface 130, a U-shaped second surface 132, sides 134,135, and a clip 136.

The first surface 130 extends parallel to the longitudinal axis of the housing 12 (FIG. 3) and divides the casing 18 between an upper portion and a lower portion. The second surface 132 extends perpendicular from the first surface 132 at the upper portion and forms a cavity 138 having an opening 140 (FIG. 22A). The sides 134, 135 extend perpendicular from the first surface 130 toward the lower portion of the casing 18. Flanges 142, 143 extend from the sides 134, 135, respectively, toward each other at the first end 18-1 of the casing 18 to define an opening 144 at the lower portion. The clip 136 is attached to the casing 18 at the second end 18-2 and extends outwardly therefrom.

Figure 9:
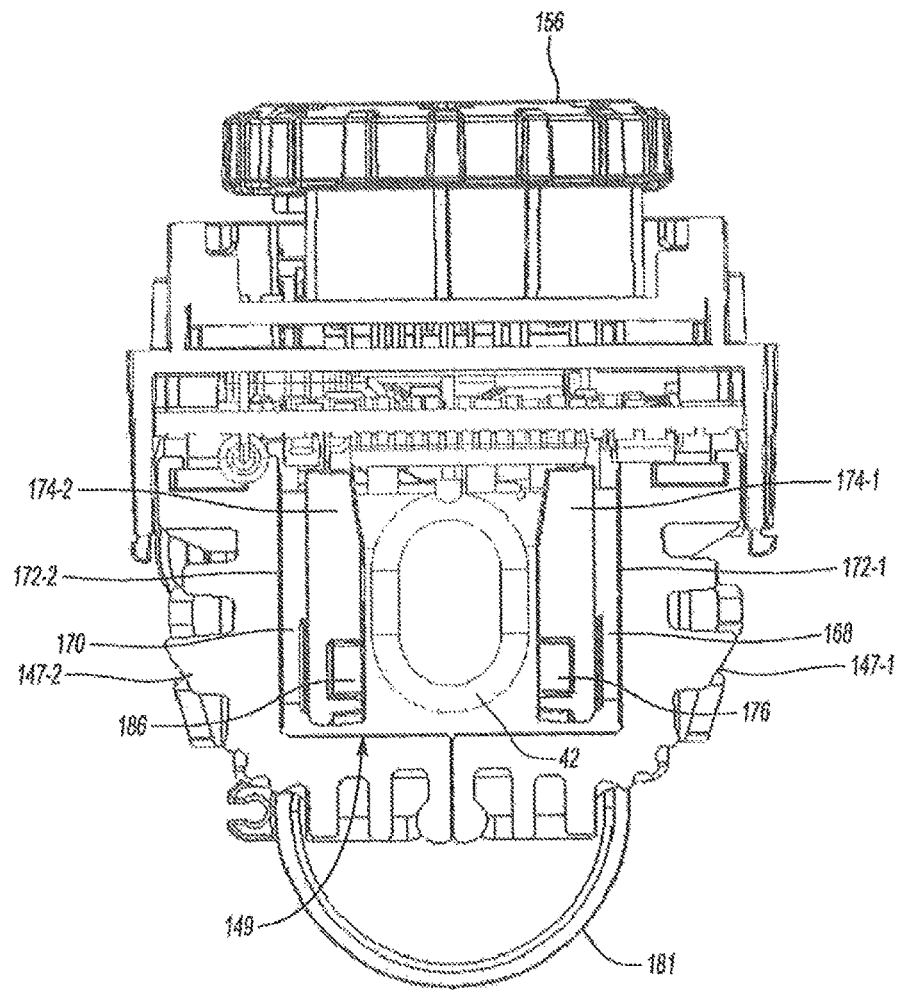
FIG. 9 is a front view of the power and control module.
Figure 10:
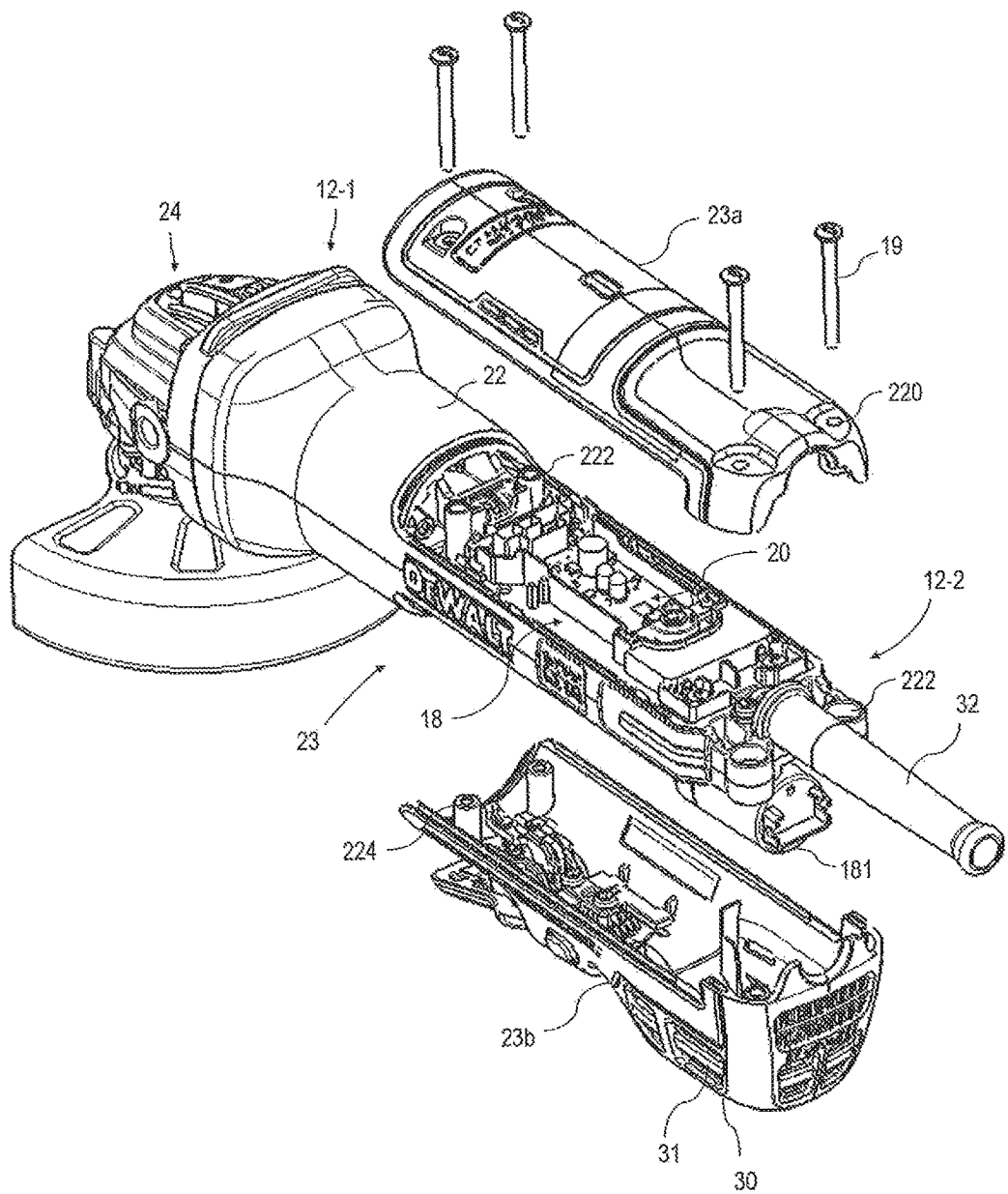
FIG. 10 is a partially exploded perspective view of an example embodiment of the power tool with handle covers exploded.
Figure 11:
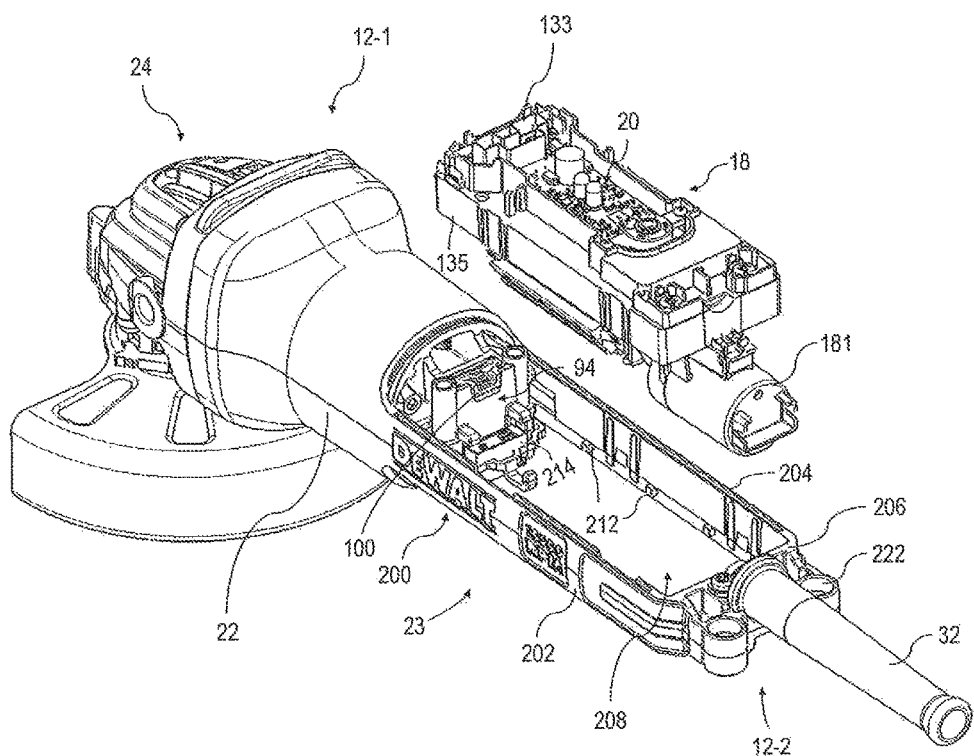
FIG. 11 is a perspective view of the example embodiment of the power tool with the power and control module removed from the handle.
Figure 12:
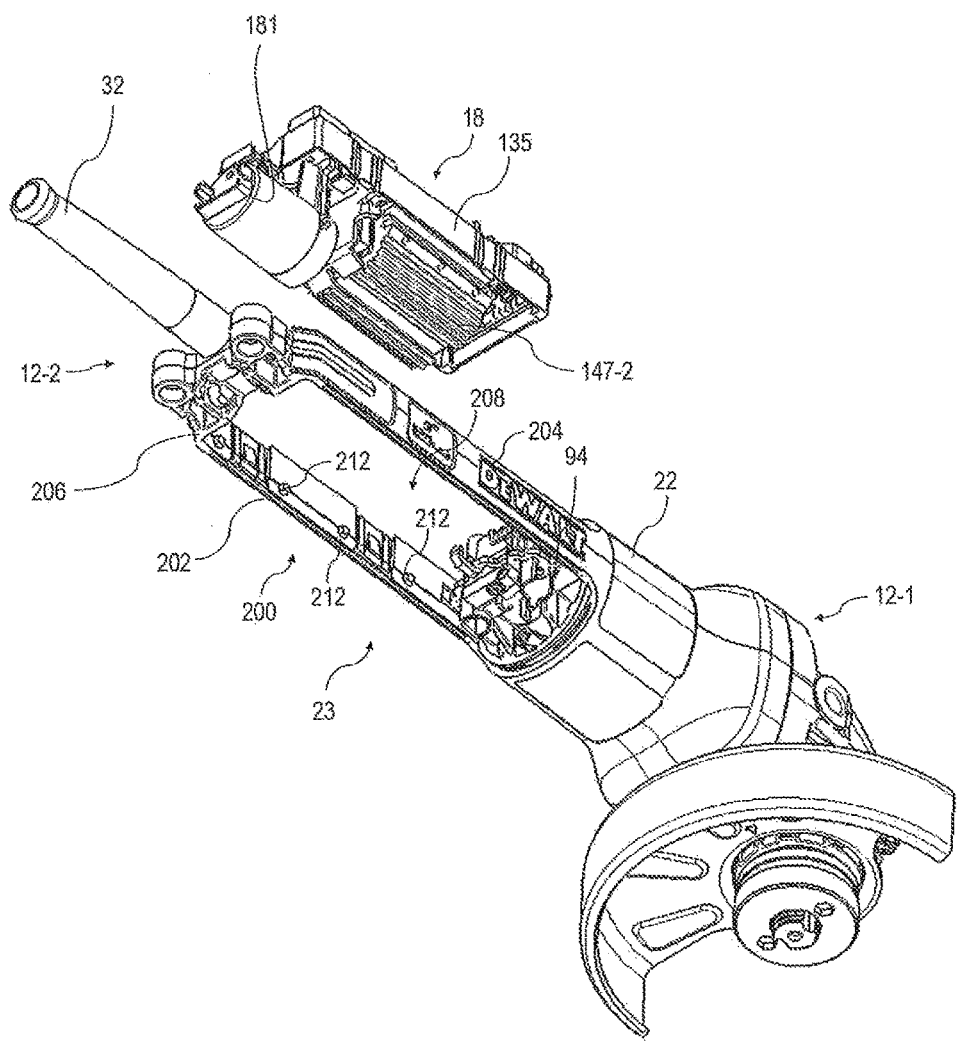
FIG. 12 depicts a bottom perspective view of the example embodiment of the power tool with the power and control module removed from the handle.
Figure 13:
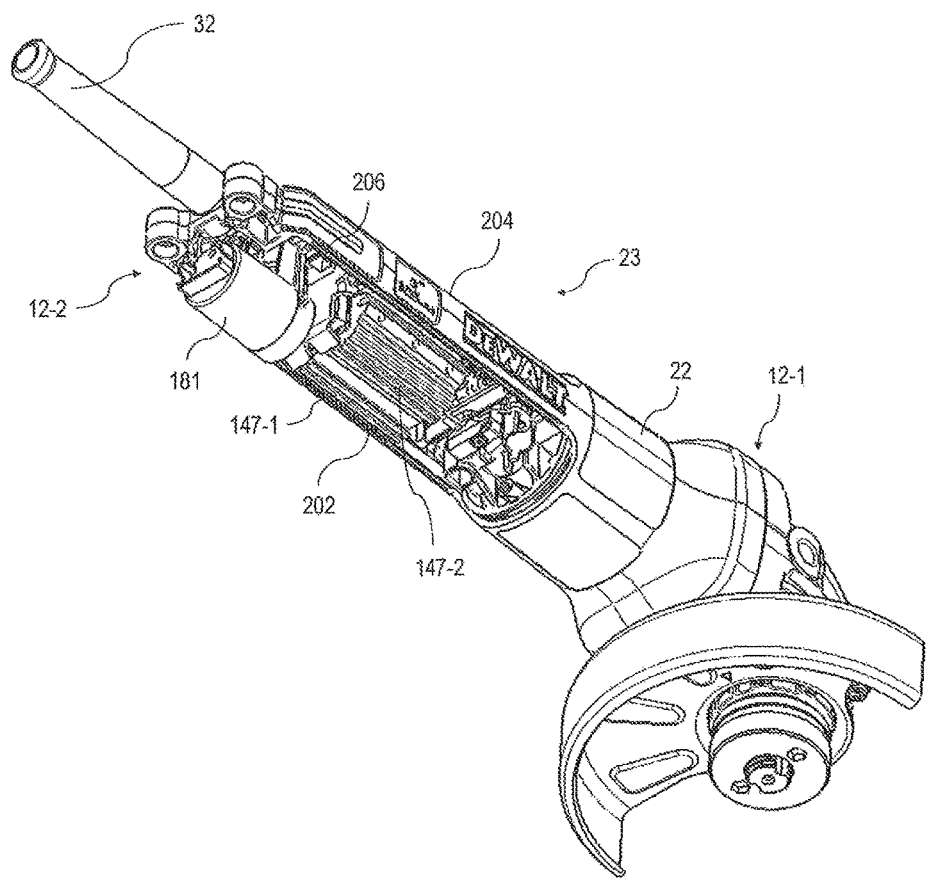
FIG. 13 depicts a bottom perspective view of the example embodiment of the power tool with the power control module positioned within the handle and handle covers removed.

A first L-shaped heat sink 147-1 and a second L-shaped heat sink 147-2 are attached to the bottom portion of the casing 18 by tabs 148. The heat sinks 147-1, 147-2 are attached to the casing 18 such that the heat sinks 147-1, 147-2 about each other to form a U-shape cavity 149 (FIG. 9).

In an embodiment, the planar circuit board 20 is attached to the module casing 18 by fasteners 152 that are attached at the second end 18-2 thereof. Alternatively, fasteners 152 may be provided for attachment of power supply wires. The planar circuit board 20 also extends axially along the longitudinal axis of the housing 12 (FIG. 3). The planar circuit board 20 divides the cavity 21 (FIG. 3) of the handle portion 23 between an upper portion and a lower portion. The planar circuit board 20 includes a first board or top segment board 150 and a second board or bottom segment board 151. The first and second boards 150, 151 are interconnected by a hinge section 153 that allow for electrical communication therebetween such that the first board 150 is folded over top of the second board 151 and the first board 150 is affixed to a top surface of the casing 18 and the second board is affixed to a bottom surface of the casing 18.

The hinge section 153 is covered and protected by a cover member 154 positioned at the first end 18-1 of the casing 18. The first board 150 is received in the cavity 138 at the upper portion of the casing 18 via the opening 140 and the second board 151 is positioned at the lower portion of the casing 18.

In an embodiment, the planar circuit board 20 includes a dial assembly 155 (or other variable-speed input mechanism), the rectifier 40, the DC bus capacitors 42, the motor switches 55, and the auxiliary capacitor 56. The dial assembly 155 in this embodiment is attached to the first board 150 of the planar circuit board 20 at the second end 18-2 of the module casing 18. The dial assembly 155 includes a dial 156, a seal 157, a frame 158 and fasteners 159. The dial 156 is attached to the frame 158. The dial 156 may be a potentiometer, for example, that permits the adjusting of current flow through the planar circuit board 20. The seal 157 is positioned between the dial 156 and the frame 158. The frame 158 is attached to the first board 150 by the fasteners 159.

The rectifier 40 is soldered to a bottom surface of the second board 151 between the auxiliary capacitor 56 and the heat sinks 147-1, 147-2. A cover 162 is attached to the rectifier 40 by a fastener 164 that extends through apertures 171, 172 of the cover 162 and the rectifier 40, receptively. The cover 162 separates the rectifier 40 from contacting the auxiliary capacitor 56. In an embodiment, the cover 162 may be made of metal to provide heat transfer from the rectifier 40. A nut 166 further secures the fastener 164, the cover 162, and the rectifier 40 together. The DC bus capacitors 42 are soldered on the bottom surface of the second board 151 in the U-shaped cavity 149 formed by the heat sinks 147-1, 147-2.

The motor switches 55 include a first set containing three adjacently oriented switches 168 and a second set containing three adjacently oriented switches 170. The first set of switches 168 are soldered to the bottom surface of the second board 151 between the heat sink 147-1 and the DC bus capacitors 42. The second set of switches 170 are soldered to the bottom surface of the second board 151 between the heat sink 147-2 and the DC bus capacitors 42.

Figure 8A:
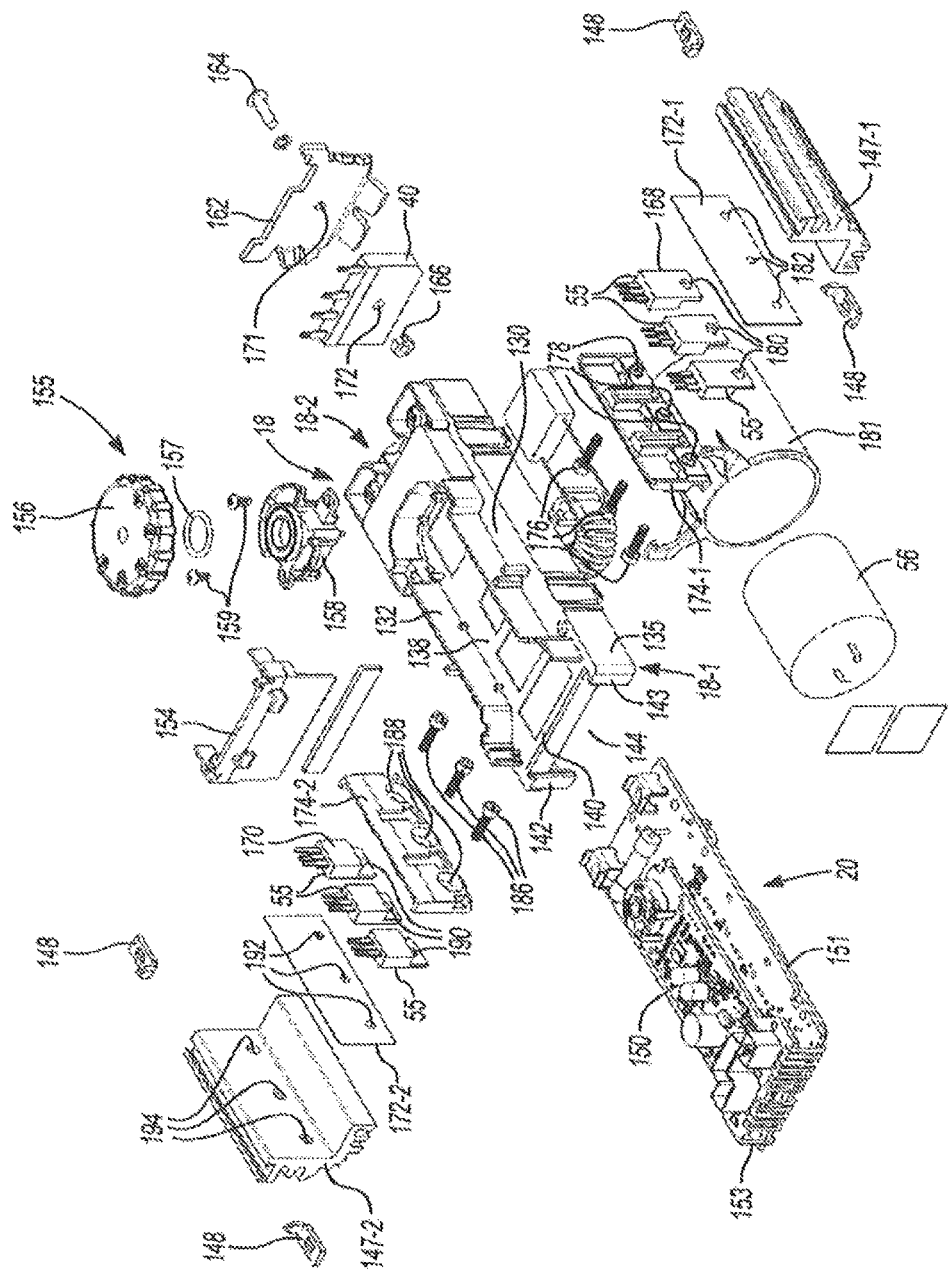
FIGS. 8A and 8B are perspective exploded views of the power and control module in normal and upside down orientations, respectively.
Figure 8B:
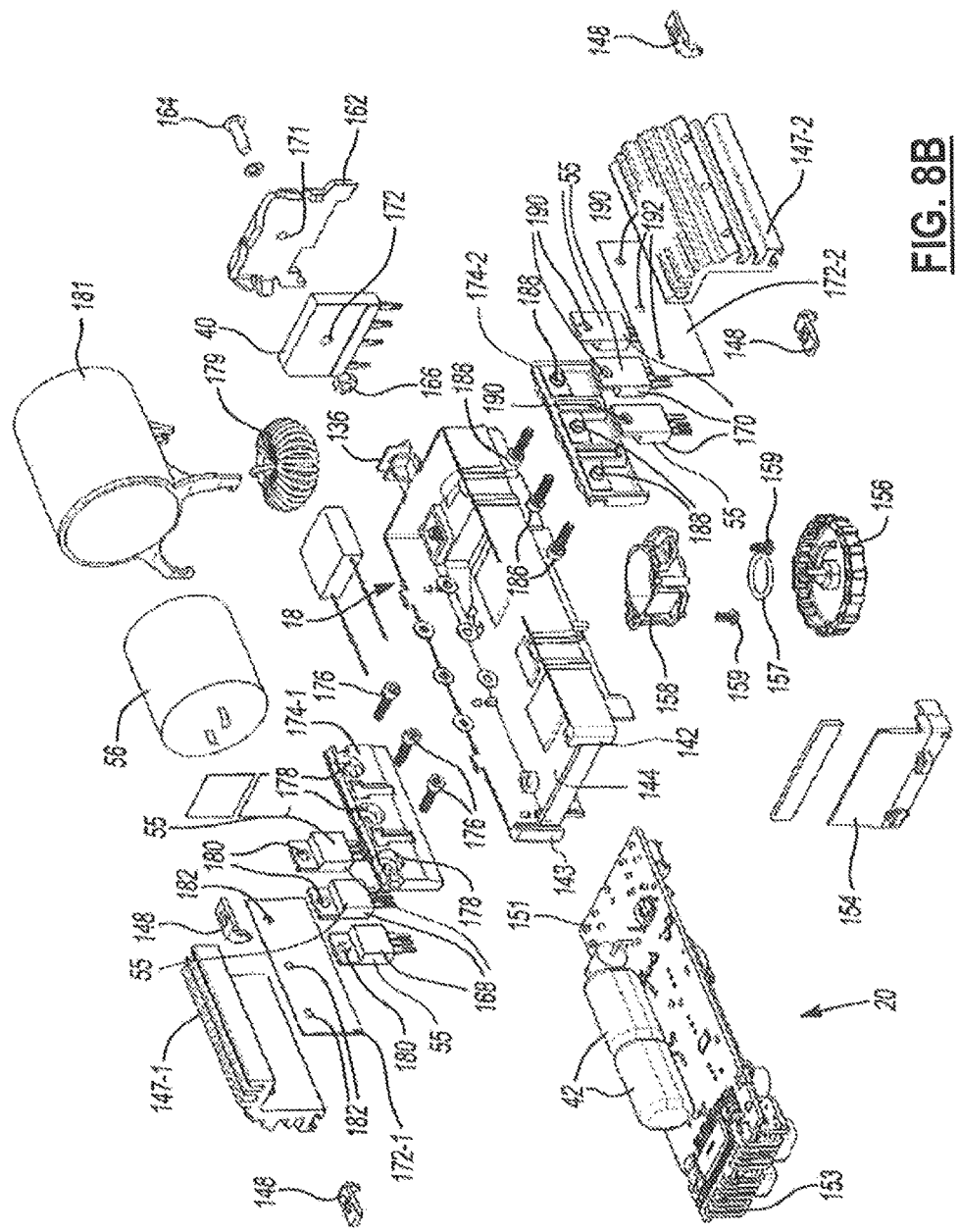

Referring to FIGS. 8A, 8B and 9, a first insulating member 172-1, such as a silicone pad, is positioned between the first set of switches 168 and the heat sink 147-1 and a second insulating member 172-2 is positioned between the second set of switches 170 and the heat sink 147-2. The first and second insulating members 172-1, 172-2 permit heat to flow therethrough to the heat sinks 147-1, 147-2, respectively, while preventing electricity therethrough. A first shielding member 174-1 is positioned between the DC bus capacitors 42 and the first set of switches 168 and a second shielding member 174-2 is positioned between the bus capacitors 42 and the second set of switches 170. A first set of fasteners 176 are securely received in apertures 178, 180, 182, of the first shielding member 174-1, the first set of switches 168, the first insulating member 172-1, and the heat sink 147-1, respectively. Similarly, a second set of fasteners 186 are securely received in apertures 188, 190, 192 of the second shielding member 174-2, the second set of switches 170, the second insulating member 172-2, and the heat sink 147-2, respectively.

The auxiliary capacitor 56 is secured to the bottom surface of the second board 151. A capacitor housing 181 is also attached to the clip 136 at the second end 18-2 of the casing 18, so that the capacitor 56 is supported within the support member 30 of the second cover 23b (FIG. 2). The capacitor 56 is adjacent to the openings 31 (FIG. 2) of the support member 30 to benefit from the entering airflow therethrough.

During operation of the power tool 10, the electrical components (e.g., capacitors 42, 56, motor switches 55, rectifier 40) generate heat. The heat sinks 147-1, 147-2 and 162 transfer the heat generated by the electrical components to the airflow passing through the area. The placement of the auxiliary capacitor 56 in the support member 30 (FIG. 2) further allows for the incoming air entering through the openings 31 to cool the auxiliary capacitor 56. Thus, the power tool 10 is less vulnerable to overheating issues.

Referring to FIGS. 10-13, the handle portion 23 extends axially from the motor case 22 toward second end 12-2 of the housing 12 to house the module casing 18, the planer circuit board 20, and all associated components described above with reference to FIGS. 7A-9 (hereinafter referred to as the control and power module) within cavity 21 of the handle portion. The first and the second covers 23a, 23b are secured together around the control and power module.

In an embodiment, the handle portion further includes a hoop-shaped control and power module support member 200 arranged to accommodate and support the module casing 18 within the handle portion 23. The support member 200 includes two elongate walls 202 and 204 that extend along the longitudinal axis of the tool from the motor case 22 toward a second end 12-2 of the housing 12. An end wall 206 connects the ends of the elongate walls 202 and 204 at the second end 12-2 of the housing 12. The elongate walls 202, 204, the end wall 206, and the partition member 94 of the motor casing 22, together form a planar opening 208 sized and arranged to receive the module casing 18 therein.

In an embodiment, the inner faces of elongate walls 202, 204 come into contact with the sides 135 of the module casing 18. The elongated walls 202, 204 may include one or more ribs/projections 212 along their lower ends on which the sides 135 of the module casing 18 rest when fully assembled.

In an embodiment, the cover 154 of the module casing 18 come into contact with an outer wall of the partition member 94. In an embodiment, a housing member 214 may project axially from the partition member 94 into the planer opening 208. In an embodiment, the housing member 214 houses the on/off switch 26 (FIG. 4). The lower end of the cover 154 rests on the housing member 214 of the partition member 194 when fully assembled.

During the assembly process, the control and power module including the module casing 18 is inserted at an angle into the planar opening 208 such that the auxiliary capacitor housing 181 is received through the planar opening 208 and positioned under the end wall 206 at the second end 12-2 of the housing 12 and the second end 18-2 (FIG. 7A) come into contact with the end wall 206. The first end 18-1 (FIG. 7A) is then received along the partition member 94 until the module casing 18 is securely in place. Wiring connections are then made from the AC power cord 32, the motor terminals, and the positional sensor board 116 to the planar circuit board 20. In an embodiment, the control and power module is provided with a connector 133 that receives wiring connections from the positional sensor board 116, on/off switch 26, and/or other motor or tool components.

In an embodiment, the first and second covers 23a, 23b are then secured to the two sides of the support member 200 to form the cavity 21 where the control and power module is secured. In an embodiment, the first and second covers 23a and 23b mate with the axial ends of the elongate walls 202 and 204 to fully encapsulate the control and power module within the handle portion 23. In an embodiment, a series of fasteners 19 received through a series of through-holes 220 of the first cover 23a and corresponding through-holes 222 of the hoop-shaped support member 200, and fastened into threaded holes 224 of the second cover 23b, to secure the first and second covers 23a and 23b to the support member 200 of the handle portion 23.

In an embodiment, the second cover 23b may be provided integrally with the elongated walls 202 and 204 as a part of the same structure. The first cover 23a is mounted and secured to the axial ends of the elongated walls 202 and 204 after the control and power module is received into the planar opening 208 and secured relative to the elongated walls 202 and 204.

The above-described embodiment provides a power tool support structure that integrally includes a motor case 22 on one end for supporting the motor 16, and the hoop-shaped support member 200 for supporting the control and power module within the handle portion, all as a part of a unitary structure. This allows the motor, and the control and power module, to be designed and assembled independently from the power tool, and later assembled into the support structure in simple steps.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A power tool comprising:
an elongated housing, wherein the housing includes a motor case disposed at a front end thereof and a handle portion extending along a longitudinal axis of the housing from the motor case to a rear end of the housing, wherein the handle portion includes two elongated walls extending rearwardly from the motor case along the longitudinal axis of the housing and a rear wall extending perpendicularly from ends of the two elongated walls proximate the rear end of the housing, wherein the two elongate walls and the rear wall form a planar opening therebetween within the handle portion;
a partition wall arranged along an axis substantially perpendicular to the longitudinal axis of the housing, the partition wall separating the handle portion from the motor case;
an electric motor having a drive shaft and mounted within the motor case;
a module casing supporting a planar circuit board received within the planar opening and supported by the elongated walls within the handle portion of the housing, the module casing extending axially along the longitudinal axis of the housing, the planar circuit board accommodating a motor drive circuit including a plurality of motor switches arranged to deliver power to the electric motor.

2. The power tool of claim 1, further comprising an output shaft drivably coupled to the drive shaft of the electric motor and extending perpendicular to the drive shaft.

3. The power tool of claim 1, wherein the partition wall is configured to support a rear bearing for the drive shaft of the electric motor and includes one or more holes that permit air flow between the motor case and the handle portion of the housing.

4. The power tool of claim 3, wherein the partition wall includes a pocket defining an open end and a closed end, wherein the open end of the pocket faces front end of the housing and is sized to receive the rear bearing.

5. The power tool of claim 4, further comprising one or more position sensors mounted to a position sense board, and a slot formed in the pocket and configured to receive the position sense board therein.

6. The power tool of claim 1, wherein a rear face of the partition wall supports the module casing within the handle portion.

7. The power tool of claim 1, further comprising a link capacitor mounted on the planar circuit board and coupled across a DC power bus receiving power from a power supply, and an auxiliary capacitor having a capacitance more than capacitance of the link capacitor and switchably coupled across the DC power bus, wherein the auxiliary capacitor is mounted in the lower section of the handle portion and at the rear end of the handle portion of the housing.

8. The power tool of claim 1, wherein the circuit board includes a top board segment integrally interconnected by a hinge section to a bottom board segment, such that the top board segment is folded over top of the bottom board segment and the top board segment is affixed to a top surface of the module casing and the bottom board segment is affixed to a bottom surface of the module casing.

9. The power tool of claim 8, wherein the planar opening divides the handle portion to an upper portion and a lower portion, wherein the module casing is received into the planar opening from the upper portion and the heat sink is disposed within the lower portion.

10. The power tool of claim 1, wherein the plurality of motor switches are mounted along two lateral side surfaces of the module casing and further includes a heat sink mounted to each of the two lateral side surfaces of the module casing, such that the heat sink is adjacent and thermally coupled to the plurality of motor switches.

11. The power tool of claim 1, wherein the module casing further includes side walls in contact with and supported by the elongated walls of the handle portion.

12. The power tool of claim 11, wherein the elongated wall comprise a plurality of ribs disposed along lower axial portions thereof for supporting the side walls of the module casing.

13. The power tool of claim 1, further comprising a first handle cover that mates with a first axial end of each of the elongated walls to encapsulate the module casing within the handle portion.

14. The power tool of claim 13, wherein the planar opening divides the handle portion to an upper portion and a lower portion, wherein the module casing is received into the planar opening from the upper portion, and the at least one handle cover is arranged over the upper portion.

15. The power tool of claim 14, further comprising a second handle cover that mates with a second axial end each of the elongated walls and arranged over the lower portion.

16. The power tool of claim 15, further comprising a plurality of fasteners received through a plurality of first through-holes of the first handle cover and a plurality of second through-holes of the handle portion, and fastened into a plurality of threaded holes of the second handle cover, to secure the first handle cover and the second handle cover to the elongated walls around the module casing.

* * * * *